UNITED STATES PATENT OFFICE.

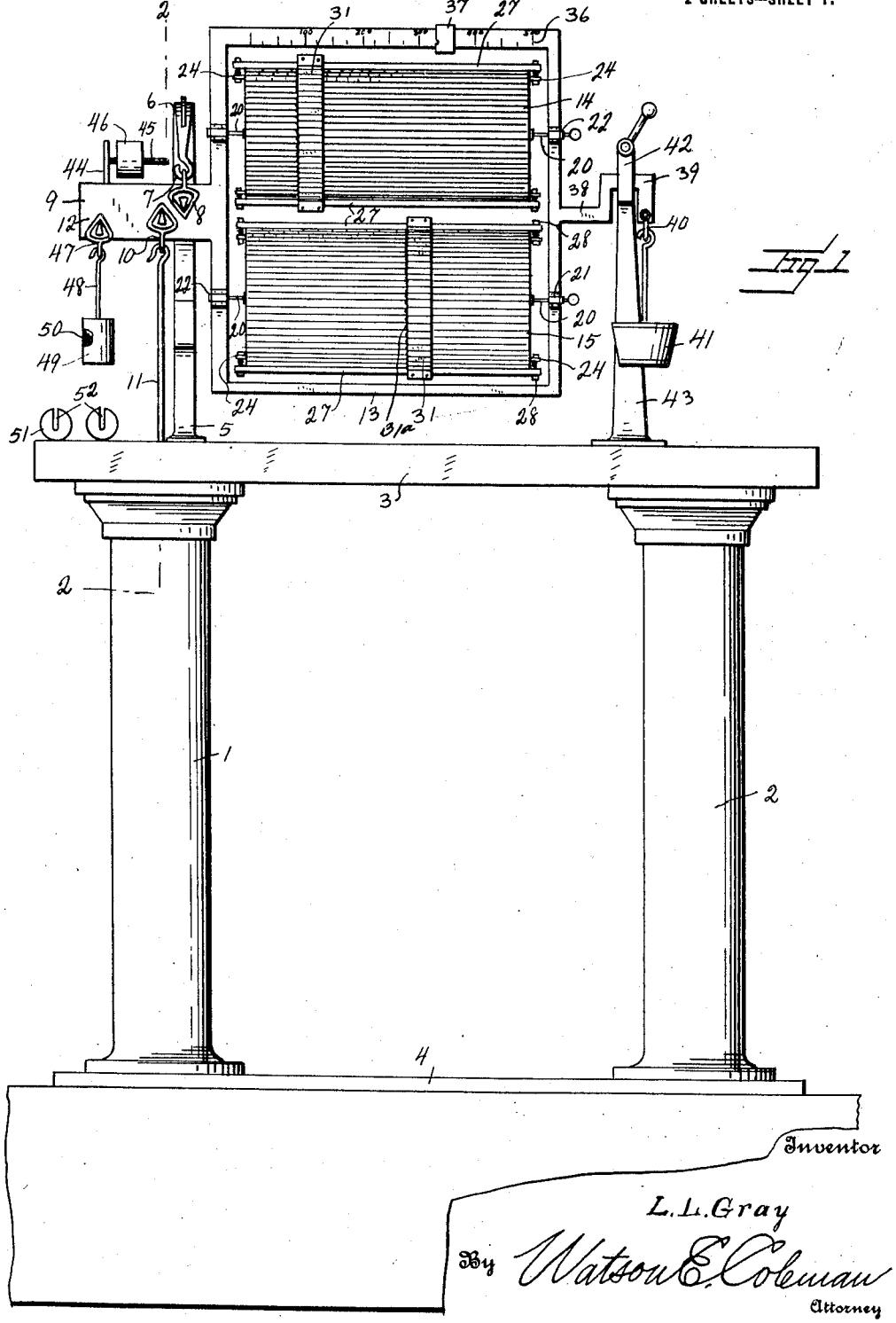

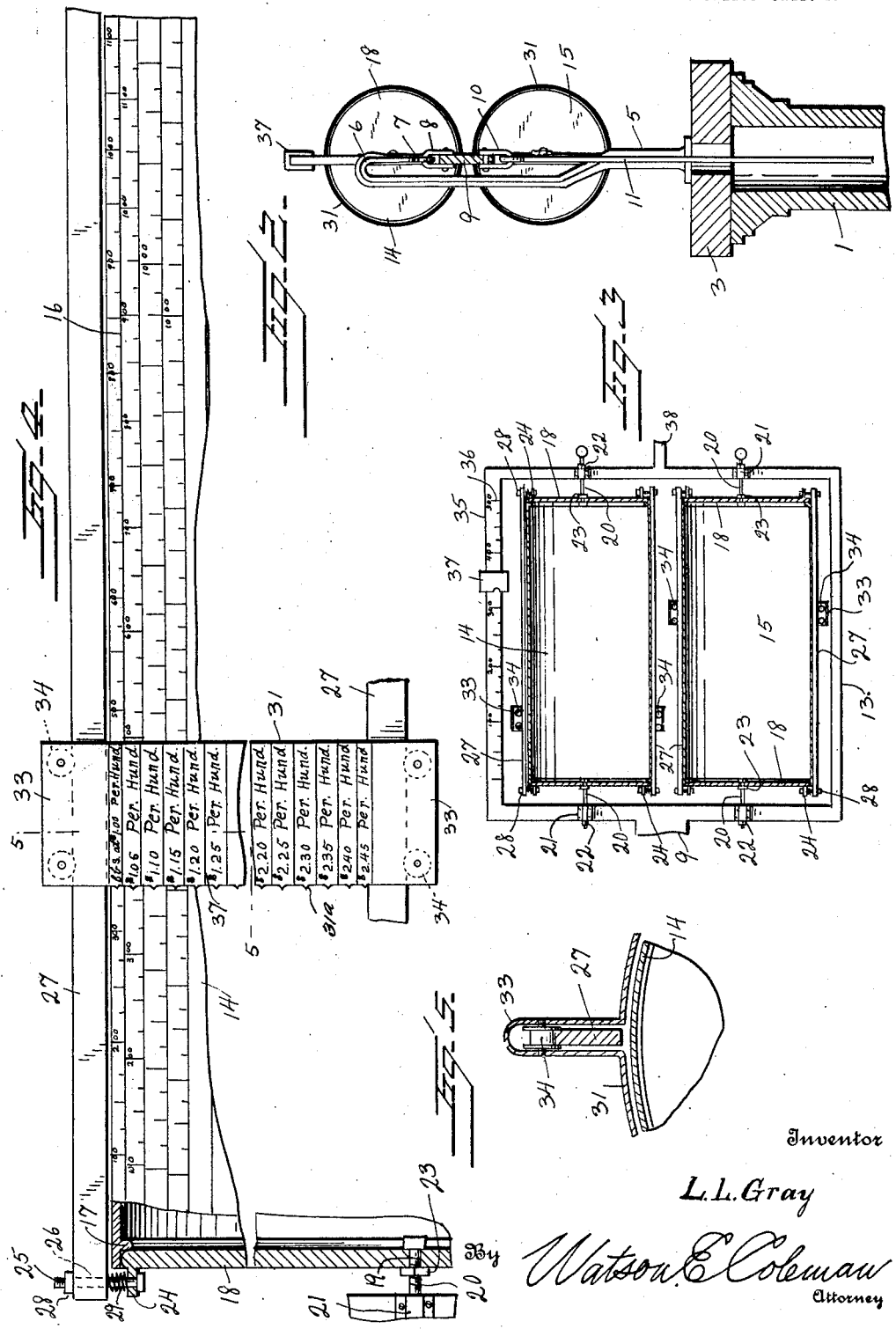

LESTER L. GRAY, OF WARREN, ILLINOIS.

COMPUTING WEIGHING-SCALE.

1,320,853.   Specification of Letters Patent.   Patented Nov. 4, 1919.

Application filed March 10, 1919. Serial No. 281,627.

*To all whom it may concern:*

Be it known that I, LESTER L. GRAY, a citizen of the United States, residing at Warren, in the county of Jo Daviess and State of Illinois, have invented certain new and useful Improvements in Computing Weighing-Scales, of which the following is a specification, reference being had to the accompanying drawings.

This invention relates to the art of weighing scales and particularly to the class known as computing weighing scales, in which the weight of commodities are computed with the various prices.

An essential object of this invention is to afford a weighing scale for weighing and computing heavy commodities, particularly cattle, grain, coal, farm produce and the like.

It is known that computing scales have been heretofore produced, particularly for light weights, but the present invention aims to provide a scale for weighing larger commodities and computing the price relative to the weight, in order to ascertain the price per hundred pounds.

However, it is to be mentioned that in connection with this particular invention there exists improved features of construction, the combination of which results in the production of a simple, efficient and practical scale beam.

The invention further aims to provide means such as rotatable computing cylinders, one super-imposed with relation to the other, and mounted for rotation in the frame of the beam, in combination with counterpoise member adjustable relatively longitudinally of the cylinders, and counter balancing weights, and adapted for such adjustment as to determine the weight of the commodity, such counter-poise member having the prices per hundred pounds thereon, so as to be computed with the weight indications on the cylinders, whereby the price per hundred pounds may be determined.

The invention further aims to provide improved means for the mounting of the counter-poise members, whereby they are adjustable relatively longitudinally of the cylinders.

The invention further aims to provide improved means for mounting the cylinders on the scale beam, whereby they are capable of manual rotation, in order that the requisite weight of the commodity may be brought opposite or in registration with the prices per hundred pounds on the counter-poise member.

While the design and structure as now illustrated and disclosed is deemed preferable, it is obvious that the same is susceptible to changes particularly at the time of reducing the invention to a practical form for commercial purposes. The right to these changes is claimed provided they are comprehended within the scope of what is claimed.

The invention comprises further features and combination of parts hereinafter set forth, shown in the drawings, and claimed.

In the drawings:

Figure 1 is a view in elevation of the improved computing scale constructed in accordance with the invention.

Fig. 2 is a vertical sectional view through the supporting pillars and the scale beam on line 2—2 of Fig. 1.

Fig. 3 is a sectional view through the computing cylinders of the scale beam, showing the connections between the cylinders and the scale beam.

Fig. 4 is an enlarged detail sectional view of a portion of one of the cylinders and a portion of the scale beam.

Fig. 5 is a detail sectional view on line 5—5 of Fig. 4.

Referring to the drawings 1 and 2 designate a pair of supporting pillars, on the upper ends of which a beam 3 is secured and supported. The pillar 1 is hollow as illustrated and 4 denotes the weighing platform of the scales. Rising upwardly from the beam 3 is a stationary arm 5 provided with an overhanging part 6 terminating in a hook 7 to engage the loop 8 which is pivotally carried by the scale beam for the support of such beam. One end of the scale beam 9, below and offset, in the present instance to the left of the loop 8 is a second loop 10, between which and the platform 4 of a suitable connection 11 is arranged. The scale beam 9 comprises the body 12, and an enlarged head frame 13. This head frame is rectangular, of skeleton form, that is open, and is so designed for the support of the computing cylinders 14 and 15, which are in super-imposed relation.

Each computing cylinder comprises a hollow sheet metal body which, when the computing cylinder is disassembled, is open-ended. The exterior surface of the cylinder is provided with longitudinally arranged scale graduations 16. These graduations give the weights of various large commodities, ranging from a hundred pounds upward. Adjacent each end of each cylinder on its interior an annular rib 17 is formed. Engaging the ribs (which are disposed a short distance inwardly from the marginal edge of the end of the cylinder) is a cylinder head or plate 18. This cylinder head or plate 18 has a central aperture 19, through which the headed supporting pin 20 extends. The supporting pins or bolts 20 at the opposite ends of the cylinders are axially alined, and the shanks of the bolts are journaled in the box bearings 21, there being nuts 22 threaded on the ends of the bolts or pins to hold them in place. Second nuts 23 are also threaded on the bolts adjacent the outer surfaces of the cylinder heads or plates, in order to prevent axial movement of the plates on the bolts. It is obvious that the cylinders are supported on the cylinder heads or plates. The cylinder heads at diametrically opposite points are provided with laterally extending lugs or ears 24, through which bolts 25 radially extend. These bolts penetrate through the openings 26 of the metal strips or bars 27, which are arranged longitudinally of the cylinder at diametrically opposite points. Suitable nuts 28 are threaded upon the bolts 25. Interposed between the end portions of the bars or strips 27 and the lugs 24 and in surrounding relation to the bolts are coil springs 29 yieldably urging the end portions of the strips or bars 27 toward the nuts 28, thereby holding them in position. Counterpoise members or bands 31 are arranged in surrounding relation to the cylinders, one for each of the cylinders. The exterior surfaces of the bands 31 are provided with graduations 32 which give the various prices per hundred pounds of various commodities. Each counter-poise member or band 31 is bent upon itself at diametrically opposite points to provide the loops 33, through which the strips or bars 27 engage. By means of the loops 33 and the bars 27, the counter-poise members or bands are guided in their movement longitudinally relatively to the cylinders. Suitable antifrictional rollers or wheels 34 are journaled in bearings of the loops 33 in order to ride upon the outer edges of the strips or bars 27, whereby the counter-poise members or bands may be easily and freely adjusted.

The upper rail 35 of the head frame is provided with scale graduations 36, ranging from one hundred pounds to five hundred, there being a counter-balancing weight 37 slidably adjustable upon the rail 35, and adapted for coöperation with the counter-poise members or bands for weighing the various commodities to be placed upon the platform.

The outer end of the head frame is provided with a reduced extension 38, formed with an overhanging goose-neck portion 39. The extremity of the depending lug of this goose-neck portion has a loop 40, to which is connected a counter-balancing weight 41. This goose-neck portion is positioned in the yoke 42 of the upstanding arm 43 of the beam 3, thereby allowing the scale beam to have a limited movement.

Rising upwardly from the body of the scale beam is an arm 44 having a right angle extending part 45, on which the counter balancing weight 46 is threaded, and capable of adjustment, whereby the weight may coöperate with the counter-poise members or bands and counter-balancing weight 37, for weighing the commodities on the platform.

A loop 47 is carried by the body of the scale beam, and engaging the loop is a depending rod 48, which rises upwardly from the bottom of a counter-balancing weight member 49. This weight member 49 may contain any quantity of shot 50, in order to increase or decrease the counter-balancing effect on the scale beam. Additional weight members 51 are provided having slots 52. These weight members 51 may be positioned above the counter-balancing weight member 49, the slot 52 receiving the depending rods 48. Any number of weight members 51 may be employed, so as to increase or decrease the counter-balancing effect on the steel beam.

In the operation, the commodity to be weighed is placed upon the platform, then the counter-poise members or bands and the counter-balancing weight members are adjusted accordingly, whereby the scale beam is balanced according to the weight of the commodity. Should the commodity weigh, say for instance, five hundred pounds and the commodity, whatever it may be, is sold at the rate say for instance, $1.75 per hundred pounds, the counter-poise member or band is rotated relative to the cylinder or vice versa, until the prices per hundred pounds register with the weight of the commodity, in which case the price according to the weight is given upon the cylinder.

While there has been illustrated and described certain arrangement of graduations and their use, it is to be understood that they may be varied. For instance, they may be arranged in higher or lower denominations. As an example of an arrangement of the graduations, the upper part of the beam is graduated from the left hand end, beginning with one pound to one hundred pounds, two hundred pounds, and so on to the right-hand end of the beam. Since the graduations of the upper part of the beam end approximately with five hundred pounds (which may be more or less, depending upon the length of the beam) the graduations on the lower part of the beam may start where the graduations end on the upper part of the beam. By this arrangement, the graduations may be arranged in pounds from one to five hundred, as the case may be, depending upon the length of the beam, and then from five hundred to a thousand pounds on the lower part of the beam, depending upon the length thereof. It is obvious that the number of pounds may be varied, as may be desired, consistent with the demands from the public on the manufacturer. Should a commodity to be weighed be placed upon the platform of the scale, the counter-poise member of the upper cylinder is advanced, as far as possible, provided the commodity weighs more than the number of pounds graduated on the upper part of the beam. For instance, if the upper part of the beam has the graduations arranged as high as five hundred pounds, and the commodity weighs eight hundred pounds, then, as before stated, the counter-poise member is moved as far as possible on the beam. Then the counter-poise member on the lower cylinder is moved, until the beam balances, and then should the commodity weigh eight hundred pounds, then this amount computed with the price per pound will be found on the cylinder.

Referring especially to Fig. 4 of the drawings, it will be seen that the marginal edges of the cylinder heads or plates 18 are rounded off, and furthermore they are not designed to fit tightly within the ends of the cylinders against the annular ribs 17, but instead to have more or less loose fits. The rounded marginal edges of the heads or plates 18 are designed for the purpose of permitting heads to more or less freely move in the ends of the cylinders. While there are slight contacts of the rounded marginal edges of the heads or plates 18, the friction is not sufficient to prevent adjustment of the cylinders relative to the heads, or the heads relative to the cylinders. In fact, the pins or bolts 20 are swiveled in their bearings 21, and are movable with the heads or plate 18, and it is obvious that the scale bars or strips 27 may be grasped, and moved about the circumference of the cylinders, in which case the heads or plates 18 will move therewith. When the scale bars or strips 27 are moved in this manner, the counterpoise members or bands 31 can be adjusted rotatably relatively to the cylinders. Furthermore, while the counterpoise members or bands 31 are movable rotatably relatively to the cylinders and vice versa, they are also capable of longitudinal movements relative to the cylinders. Also, the cylinders are capable of movements rotatably relatively to the heads, as well as to the counterpoise members or bands 31, in order that the various amounts of weights may be computed with the prices per hundred pounds, that are printed upon the counterpoise members or bands. The coil springs 29 which are interposed between the lugs or ears 28 and the strip or bar 27 act to hold the strip or bar 27 spaced out of contact with the circumference of the cylinders, hence preventing the bars or strips from marring the surface of the cylinder, particularly the graduated scales of weights, which are printed or otherwise formed or stamped thereon.

The invention having been set forth, what is claimed as new and useful is:

1. In a computing scale, a scale beam comprising a body having a head frame, computing cylinders, means rotatably connected to the opposite ends of the head frame and being fitted into the ends of the cylinders to move rotatably whereby the cylinders are supported rotatably movable.

2. In a computing scale, a scale beam, comprising a body having a head frame, computing cylinders, means carried by the head frame and fitting within the end of the cylinders for rotatably supporting the same, guide bars adjacent the cylinders at diametrically opposite points and connected to the supporting means, and counter-poise elements having means engaging the guide bars whereby they are capable of longitudinal movement relatively to the cylinders.

3. In a computing scale, a scale beam, having a skeleton head frame, computing cylinders, cylinder heads rotatably supported at opposite ends of the head frame, and in turn supporting the cylinders rotatably, guides carried by the cylinder heads, and counter-poise elements mounted upon the guides for longitudinal movement relative to the cylinders.

4. In a computing scale, a scale beam having a head frame, computing cylinders, means for supporting the cylinders rotatably in the head frame, diametrically opposite guides yieldably connected to the supporting means, and counter-poise elements mounted upon the guides for longitudinal movement relative to the cylinders, and being in surrounding relation thereto.

5. In a computing scale, a scale beam having a head frame, computing cylinders, means for supporting the cylinders rotatably in the head frame, diametrically opposite guides yieldably connected to the supporting means, and counter-poise elements mounted upon the guides for longitudinal movement relative to the cylinders, and being in surrounding relation thereto, the upper rail of the skeleton head frame having a scale of graduations, and a counter-balancing weight on the upper rail.

6. In a computing scale, a scale beam provided with a skeleton head frame, computing cylinders, cylinder heads rotatably carried in the head frame and fitting within the cylinders, whereby the cylinders are rotatably mounted, guide bars yieldably connected to the cylinder heads, and annular counterpoise elements mounted on the guides for longitudinal movement relative to the cylinders.

7. In a computing scale, a scale beam provided with a skeleton head frame, computing cylinders, cylinder heads rotatably carried in the head frame and fitting within the cylinders, whereby the cylinders are rotatably mounted, guide bars yieldably connected to the cylinder heads, annular counter-poise bands in surrounding relation to the cylinders and provided with graduations giving the price per hundred pounds, said bands having diametrically opposite loops provided with anti-frictional rollers engaging said guides, whereby the bands are capable of movement longitudinally on the cylinders, said bands being in surrounding relation to the cylinders, the upper rail of the head frame having a scale of graduations, and a counter-balancing weight adjustable on the upper rail.

8. In a computing scale, a scale beam provided with a skeleton head frame, computing cylinders, cylinder heads rotatably carried in the head frame and fitting within the cylinders, whereby the cylinders are rotatably mounted, guide bars yieldably connected to the cylinder heads, annular counter-poise bands in surrounding relation to the cylinders and provided with graduations giving the price per hundred pounds, said bands having diametrically opposite loops provided with anti-frictional rollers engaging said guides, whereby the bands are capable of movement longitudinally on the cylinders, said bands being in surrounding relation to the cylinders, the upper rail of the head frame having a scale of graduations, and a counter-balancing weight adjustable on the upper rail, said scale having a body member, and connections between the body member and the scale platform, and additional counter-balancing members on the scale beam on the opposite side of the connections remote from the head frame.

9. In a computing scale, the combination with a scale beam comprising a body and having a head frame, of computing cylinders, means rotatably connected to each end of the head frame, and fitting rotatably movable within the ends of the cylinder for supporting the cylinder, guides mounted on said means, and counter-poise elements mounted on the guides for longitudinal movement relative to the cylinder.

10. In a computing scale, the combination with a scale beam having a head frame, of computing cylinders, means rotatably mounted in the opposite ends of the head frame and fitting rotatably movable within the ends of the cylinders for supporting the cylinders to permit them to be rotated, guides, counter-poise elements mounted on the guides and being movable longitudinally relatively to the cylinders, and yieldable connections between the guides and said means.

In testimony whereof I hereunto affix my signature in the presence of two witnesses.

LESTER L. GRAY.

Witnesses:
M. J. PAUL,
J. P. CARSON.

Copies of this patent may be obtained for five cents each, by addressing the "Commissioner of Patents, Washington, D. C."